United States Patent
Boltze et al.

[15] 3,669,967
[45] June 13, 1972

[54] PHARMACOLOGICALLY ACTIVE QUINAZOLINONE COMPOUND, ITS USE IN PHARMACOLOGICAL PREPARATIONS AND PROCESS FOR ITS PREPARATION

[72] Inventors: Karl-Heniz Boltze, Bensberg-Kippekausen; Dietrich Lorenz, Kleinhurden, Post B. Bensberg, both of Germany

[73] Assignee: Troponwerke Dinklage & Co., Berliner Strasse, Cologne-Mulheim, Germany

[22] Filed: July 15, 1970

[21] Appl. No.: 55,247

[30] Foreign Application Priority Data

July 18, 1969 Germany .................... P 19 36 588.9

[52] U.S. Cl. .................................. 260/256.4 Q, 424/251
[51] Int. Cl. ........................................... C07d 51/48
[58] Field of Search ........................... 260/256.4 Q

[56] References Cited

OTHER PUBLICATIONS

Wagner et al.– " Synthetic Organic Chemistry" – Wiley and Sons, Inc.– New York– 1953– pp. 666– 67, 672

*Primary Examiner*—Alex Mazel
*Assistant Examiner*—R. V. Rush
*Attorney*—Burgess, Dinklage & Sprung

[57] ABSTRACT

2-Methyl-3-{N-[3-(4-phenylpiperazinyl-(1))-2-hydroxypropyl-(1)]-anilino}quinazolinone-(4) and its non-toxic acid addition salts which have a strong cataleptic activity.

2 Claims, No Drawings

3,669,967

PHARMACOLOGICALLY ACTIVE QUINAZOLINONE COMPOUND, ITS USE IN PHARMACOLOGICAL PREPARATIONS AND PROCESS FOR ITS PREPARATION

This invention relates to a pharmacologically active quinazolinone compound, its use in pharmacological preparations and process for its preparation.

Quinazolinone derivatives are already known for their use in human medicine as sedatives, anticonvulsants and hypnotics, the substituents in such derivatives being present in the 2- and/or 3-position.

It has now surprisingly been found that by further variation of the substituents, a compound which has a neuroleptic activity is obtained.

2-Methyl-3-{N-[3-(4-phenylpiperazinyl-(1)-2-hydroxypropyl-(1)]-anilino}-quinazolinone-(4) of formula I

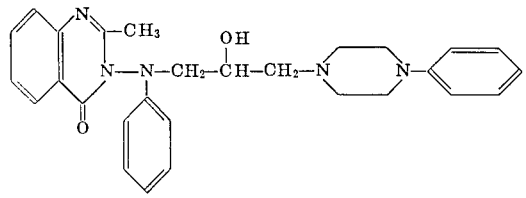

shows a powerful cataleptic activity both in rats and in mice when administered per os in doses of 2 mg/kg or more. In addition, it has antioedematous and hypotensive activities. As can be shown by animal experiments, the mechanism of its action is based on a reduction of the catecholamine level in the central nervous system, which is greater than the reduction brought about by reserpine.

The toxicity of the substance is low compared with the effective dose, the $LD_{50}$ values being 60 to 70 mg/kg for intravenous injection and 800 to 1,000 mg/kg for oral administration in mice and rats, so that the compound is non-toxic for therapeutic purposes.

The invention therefore provides such compound, a process for its preparation and pharmaceutical compositions containing it in association with a pharmaceutically acceptable carrier and if desired other medicaments.

The compound according to the invention may be used in the form of an acid addition salt such as a hydrochloride and the invention extends to such salts also.

The compound is obtained from the known compound 2-methyl-3-phenylaminoquinazolinone-(4) by reaction with 2-chloromethylethylene oxide which provides an 80 percent yield of 2-methyl-3-(2,3-epoxypropyl)-anilinoquinazolinone-(4) which is then reacted with phenyl piperazine.

The following example illustrates the invention.

EXAMPLE

Eleven grams (0.035 mol) of 2-methyl-3-(2,3-epoxypropyl)-anilinoquinazolinone-(4) and 4.85 g (0.03 mol) of phenyl-piperazine are dissolved in 30 ml of methanol and boiled for 3½ hours. After removal of methanol by distillation, the residue is taken up in methanolic hydrochloric acid, and the dihydrochloride formed is recrystallized twice from ethanol.

The yield of 2-methyl-3-{N-[3-(4-phenyl-piperazinyl(1))-2-hydroxypropyl-(1)]-anilino}-quinazolinone-(4) dihydrochloride was 9 g. Its melting point is 210° C.

For $C_{28}H_{26}N_5O_2 \cdot 2$ HCl

Calculated: C = 60.05%; H = 6.07%; N = 12.50%; Cl = 14.23%

Found: C = 60.26%; H = 6.18%; N = 12.49%; Cl = 13.95%.

The free base obtained from the dihydrochloride by dissolving it in dilute sodium hydroxide solution, extracting it with ether, drying the ethereal layer, evaporating off the ether and recrystallizing from ethanol melts at 85° C.

What is claimed is:

1. The compound 2-methyl-3- N-[3-(4-phenylpiperazinyl-(1))-2-hydroxypropyl-(1)]-anilino -quinazolinone-(4) and its non-toxic acid addition salts.

2. The hydrochloride of the compound specified in claim 1.

* * * * *